3,190,794
COLLOIDAL IODINE COMPOSITION FOR PROTECTION OF TOBACCO AGAINST VIRUS AND FUNGUS INFECTION
Wilbert Moody Wilson, Helmetta, N.J., assignor to George W. Helme Company, Helmetta, N.J.
No Drawing. Filed May 2, 1963, Ser. No. 277,479
2 Claims. (Cl. 167—17)

This invention relates to a composition of matter to treat tobacco plant diseases and more particularly to a composition of matter and to a method of applying it to tobacco plants.

Tobacco plants are susceptible to various diseases such as blue mold fungus and also to virus attack.

Various prior art compositions are too toxic to use on tobacco plants especially on mature plants ready for cutting since the toxicity of these compositions is then introduced into tobacco ready for commercial use.

It is an object of this invention to provide a fungicide and viricide for tobacco plants.

It is another object to provide a dusting composition which is of low or negligible toxicity to humans and thus is useable as a fungicide even shortly before harvest time.

It is a further object to provide a composition of matter which will not discolor or otherwise affect the appearance of the wrapper or leaf tobacco on a growing plant.

It is another object to provide a fungicidal composition which is of inexpensive manufacture.

It is yet another object to provide a fungicide which will not affect the taste of the tobacco.

These and other objects of this invention will become apparent upon reading the following descriptive disclosure of many illustrative embodiments thereof.

According to this invention, an aqueous suspensoid solution of iodine of about 10 to about 16 percent total iodine content and containing from about one-tenth of one percent gum arabic to about thirty five percent gum arabic is introduced as by spraying and tumbling onto tobacco powder of about 200 mesh to obtain an overall tobacco composition containing about two to about four percent iodine by weight.

The gum arabic functions as a protective colloid for the colloidal iodine thereby preventing agglomeration of the iodine.

Iodine is but sparingly soluble in water so that the colloidal iodine of this invention in part serves as a reservoir for the soluble iodine.

Moreover the protective colloid serves as an adherent to help the tobacco dust composition to stick to the tobacco plant.

In lieu of gum arabic other protective colloids, such as gum tragacanth, are operable.

Even synthetic resins such as polyethylene oxide are operable as the protective colloid.

Moreover, the aqueous suspensoid solution of iodine may have a total iodine content above or below the ten to sixteen percent value given above for normal commercial operation. Also the mesh of the tobacco dust may be varied from the 200 mesh value within relatively wide limits as it is a mechanical vehicle of aid primarily in the distribution of the iodine onto the tobacco plant.

In theory the tobacco plant slowly absorbs the iodine soluble in the water present in the moist dust. As this iodine is absorbed it is replenished from the colloidal iodine reservoir.

Thus the plant receives iodine systemically and becomes fungistatic and substantially immune to attack by virus.

Where the composition as dusted on the plants falls on fungus, such as blue mold fungus, it kills the fungus by the elemental iodine present in the composition. Thus the composition is useable to effect a fungistatic condition in healthy plants and it is also useable on diseased plants to rid them of the disease without any deleterious effect on the tobacco plant or to the consumer of the tobacco made from the plants so treated.

In preparing the dusting composition of this invention, the protective colloid gum arabic, is dissolved in water in an amount sufficient to obtain the desired strength. Next, a mixture of water and commercial iodine is introduced into a fluid jet mill, such as a Trost mill, wherein the iodine particles are exposed to collision of counter flowing jet streams containing iodine particles to form colloidal iodine. Lastly the prepared colloidal iodine solution is introduced as by spraying onto the ground tobacco dust. To obtain a uniform distribution of the iodine, the sprayed tobacco dust is tumbled until the desired physical condition of the preparation with chemical interaction of the iodine with the tobacco dust is obtained.

As an example of this invention, a composition of 200 mesh tobacco dust was sprayed uniformly while tumbling with a colloidal suspensoid-solution of iodine of this invention containing ten percent over-all iodine and five percent gum arabic. A conventional bowl tumbler such as is used in the pharmaceutical industry was employed to prepare this composition of matter. The prepared solution was then added until a total of three percent iodine was introduced into the composition. After tumbling for a few extra minutes to obtain uniformity of distribution, the composition was ready for use. The killing effect of this composition was then tested on blue mold fungus grown in Petri dishes using standard procedure. In all cases the blue mold fungus was killed by the composition herein.

This invention has been described by means of several embodiments but it is not limited to these embodiments.

I claim:

1. A viricidal-fungicidal free flowing iodine containing dusting composition of matter for dusting growing tobacco plants consisting of finely ground tobacco dust and sufficient aqueous colloidal solution of about one-tenth of one percent to about thirty-five percent protective colloid and of about 10 to 16 percent colloidal iodine content to give an iodine content of about two to about four percent to said composition.

2. The method of simultaneously protecting from and eradicating both fungus and virus growth from growing tobacco plants comprising dusting said plants with a virus-fungus free tobacco dusting composition consisting of finely ground tobacco dust and sufficient aqueous protective colloid solution of colloidal iodine of ten to sixteen percent iodine strength to give an over-all iodine content of about two to about four percent iodine to said composition.

References Cited by the Examiner
UNITED STATES PATENTS

| | | | |
|---|---|---|---|
| 1,866,923 | 7/32 | Chandler | 167—70 |
| 1,870,383 | 8/32 | Sanders | 167—42 |
| 1,925,135 | 9/33 | Chandler | 167—70 |

(Other references on following page)

UNITED STATES PATENTS

| | | | |
|---|---|---|---|
| 1,964,518 | 6/34 | Karns | 167—17 |
| 1,972,718 | 9/34 | Sharlit | 131—17 |
| 2,291,735 | 8/42 | Leffler | 167—17 |
| 2,567,584 | 9/51 | Thomas | 167—70 |
| 2,734,314 | 2/56 | Mackay | 167—17 |
| 2,840,510 | 6/58 | Katz et al. | 167—93 |
| 2,941,921 | 6/60 | Darlington | 167—30 |
| 2,977,278 | 3/61 | Shelanski et al. | 167—17 |
| 3,000,764 | 9/61 | Drucker | 131—17 |

FOREIGN PATENTS 293,504  7/28  Great Britain.

OTHER REFERENCES

The Merck Index, Merck and Co., Rahway, N.J., 1960, 7th edition, p. 558.

JULIAN S. LEVITT, *Primary Examiner.*

LEWIS GOTTS, *Examiner.*